United States Patent
Horne et al.

[11] Patent Number: 6,021,805
[45] Date of Patent: Feb. 8, 2000

[54] BACKFLOW PREVENTER ASSEMBLY

[75] Inventors: Timothy P. Horne, Andover; Dale S. Tripp, North Andover, both of Mass.

[73] Assignee: Watts Investment Company, Wilmington, Del.

[21] Appl. No.: 09/093,678

[22] Filed: Jun. 9, 1998

[51] Int. Cl.[7] .................................................. F16K 27/00
[52] U.S. Cl. ........................ 137/375; 137/512; 251/367
[58] Field of Search ............................ 251/367; 137/375, 137/512

[56] References Cited

U.S. PATENT DOCUMENTS

| | | | |
|---|---|---|---|
| 3,612,096 | 10/1971 | Kish et al. | 137/454.5 |
| 3,812,878 | 5/1974 | Bird et al. | 137/512 |
| 3,906,987 | 9/1975 | Rushforth et al. | 137/218 |
| 4,013,088 | 3/1977 | Gocke et al. | 137/116 |
| 4,159,025 | 6/1979 | Hartburn | 137/512 |
| 4,231,387 | 11/1980 | Dixon | 137/218 |
| 4,284,097 | 8/1981 | Becker et al. | 137/218 |
| 4,333,495 | 6/1982 | Griswold et al. | 137/484.2 |
| 4,478,236 | 10/1984 | Neuzeret et al. | 137/107 |
| 4,878,515 | 11/1989 | Stevens | 137/218 |
| 4,945,940 | 8/1990 | Stevens | 137/218 |
| 4,991,622 | 2/1991 | Brewer et al. | 137/512 |
| 5,046,525 | 9/1991 | Pavell | 137/512 |
| 5,226,441 | 7/1993 | Dunmire et al. | 137/15 |
| 5,385,166 | 1/1995 | Dunmire et al. | 137/15 |
| 5,503,176 | 4/1996 | Dunmire et al. | 137/15 |

*Primary Examiner*—John Fox
*Attorney, Agent, or Firm*—Fish & Richardson P.C.

[57] ABSTRACT

A backflow preventer assembly includes a housing, a first mounting assembly configured for assembling by insertion with a first end of the housing, and a second mounting assembly configured for assembling by insertion with a second end of the housing. The housing and mounting assemblies include through bores in fluid communication. Securing material secures opposed surfaces of the first mounting assembly and the housing, and opposed surfaces of the second mounting assembly and the housing. Plating material is located on the inner surfaces of the housing and mounting assemblies. The plating material forms a wall restricting migration of the securing material into the housing and mounting assembly bores. Ball valves and check valves are attached to the mounting assemblies. The housing wall defines a port providing access to the check valves.

23 Claims, 3 Drawing Sheets

BACKFLOW PREVENTER ASSEMBLY

BACKGROUND OF THE INVENTION

This invention relates to a backflow preventer.

Backflow preventers are principally used for preventing contamination of a public water distribution system by preventing backflow or back-siphonage of contaminated water into the system. Usually, the backflow preventer assembly is installed in a pipeline between a main supply line and a service line that feeds an installation, e.g., hotels, factories or other institutions, or even a multi or single family residence. A backflow prevention assembly typically includes two check valves permitting flow only in the direction from the main supply line to the service line.

SUMMARY OF THE INVENTION

According to the invention, a backflow preventer. assembly includes a housing having a first end and a second end, a first mounting assembly configured for assembling by insertion with the first end of the housing, and a second mounting assembly configured for assembling by insertion with the second end of the housing. The housing includes a wall having an inner surface defining a through bore extending between the first and second ends. The first and second mounting assemblies each includes a wall having an inner surface defining a through bore in fluid communication with the housing through bore. Securing material secures opposed surfaces of the first mounting assembly and the housing, and opposed surfaces of the second mounting assembly and the housing. Plating material is located on the inner surfaces of the housing and mounting assemblies. The plating material forms a wall restricting migration of the securing material into the housing and mounting assembly bores.

Embodiments of the invention may include one or more of the following features.

The opposed surfaces include an outer surface of the first mounting assembly wall, an outer surface of the second mounting assembly wall, and an inner surface of the housing wall. The securing material is solder. The plating material is nickel.

The first and second mounting assemblies each include an inner end and an outer end. The outer ends are threaded. A first ball valve assembly is threadedly attached to the outer end of the first mounting assembly, and a second ball valve assembly is threadedly attached to the outer end of the second mounting assembly.

An outer surface of the housing wall, an outer surface of the first mounting assembly wall, an outer surface of the second mounting assembly wall, an outer surface of the first ball valve assembly, and an outer surface of the second ball valve assembly include plating material, e.g., nickel. Inner surfaces of the ball valve assemblies include plating material, e.g., nickel.

The inner ends of the mounting assemblies are threaded. A first check valve assembly is threadedly attached to the inner end of the first mounting assembly, and a second check valve assembly is threadedly attached to the inner end of the second mounting assembly.

The housing wall defines a port. A cover closes the port. The backflow preventer assembly includes a plurality of test cocks. The backflow preventer assembly includes a pressure reduction assembly.

According to another aspect of the invention, a method of mounting ball valves and check valves to a backflow preventer includes securing opposed surfaces of a first mounting assembly and a housing with securing material securing opposed surfaces of a second mounting assembly and the housing; and plating an inner surface of the housing, an inner surface of the first mounting assembly, and an inner surface of the second mounting assembly with plating material. The plating material forms a wall restricting migration of the securing material into the housing and mounting assembly bores.

Other embodiments of the invention may include one or more of the following features.

Ball valve assemblies are threadedly attached to outer ends of the first and second mounting assemblies. Check valve assemblies are threadedly attached to inner ends of the first and second mounting assemblies.

Advantages of the invention include a backflow preventer assembly that is less expensive to manufacture than currently available backflow preventer assemblies for similar applications.

Other features and advantages of the invention will become apparent from the following detailed description and from the claims.

DESCRIPTION OF THE PREFERRED EMBODIMENT

Figure 1:
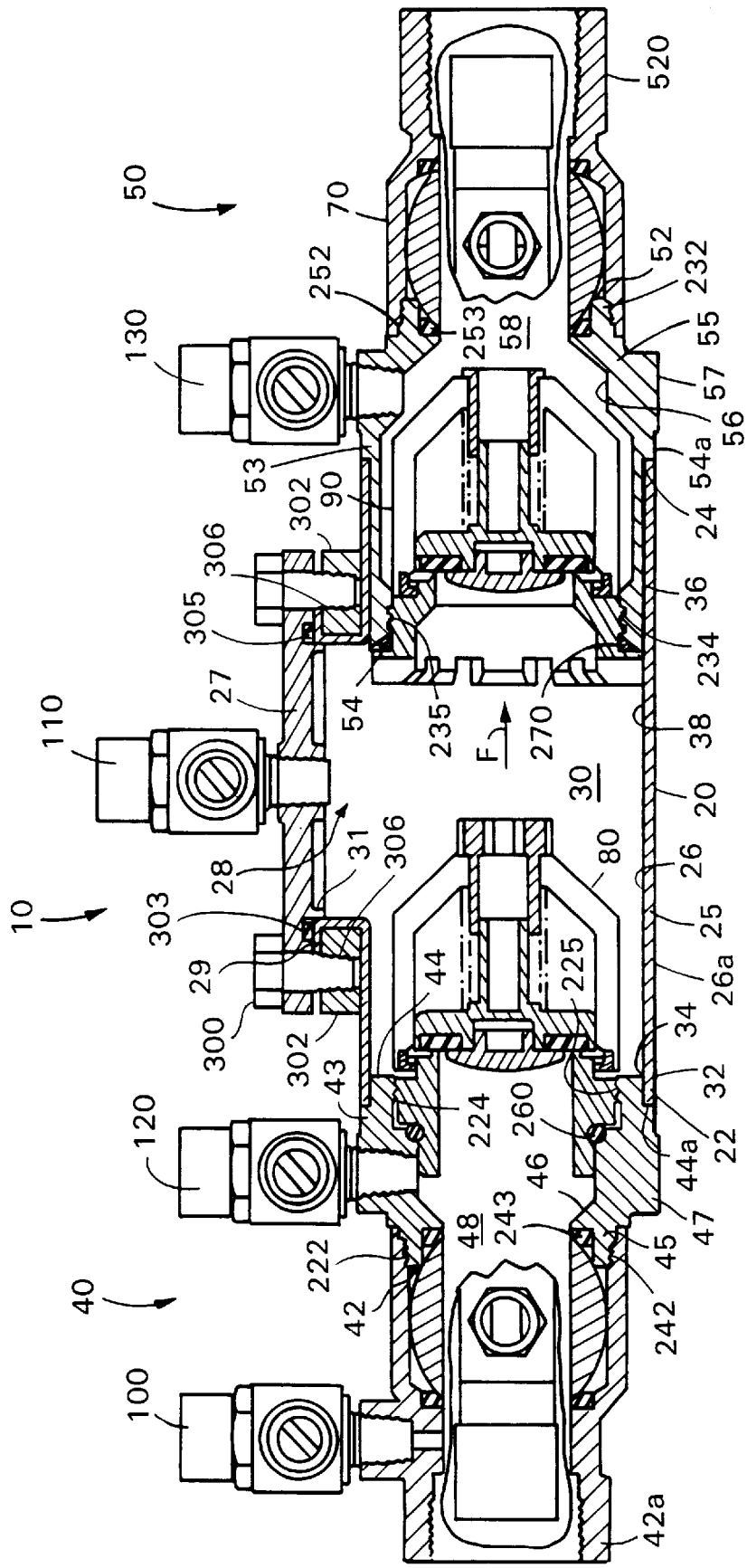
FIG. 1 is a cross-sectional view of a backflow preventer assembly according to the invention.

Referring to FIG. 1, a backflow preventer assembly 10 includes a housing 20 having a first end 22, a second end 24, and a wall 25. A through bore 30 extends between ends 22, 24 of housing 20 for flow of water therethrough. A pair of valve modules 40, 50 are located at ends 22, 24, respectively, of housing 20.

Valve module 40 includes a mount 43, a ball valve assembly 60, e.g., Ball Valve Assembly Part No. FBV-E-775 available from Watts Industries, North Andover, Mass., and a check valve assembly 80, e.g., Check Valve Assembly Part No. SA-775CA37 also available from Watts Industries. A through bore 48 defined by mount 43 and ball valve assembly 60 is in fluid communication with housing bore 30 when check valve assembly 80 is in an open, flow position. Mount 43 has an outer end 42, an inner end 44, and a wall 45 having an outer surface 47 and an inner surface 46. Inner end 44 of mount 43 steps down in diameter at a shoulder 44a to define a contact surface 32. To secure mount 43 to housing 20, inner end 44 of mount 43 is inserted into first end 22 of housing 20, with contact surface 32 abutting an inner surface 26 of housing 20. Securing material 34, e.g., solder or brazen, is used to connect contact surface 32 to inner surface 26 of wall 25.

Outer end 42 of mount 43 defines external threads 222. Ball valve assembly 60 defines cooperating internal threads 242 for connecting ball valve assembly 60 to mount 43. An o-ring 243 is located between mount 43 and ball valve assembly 60 to prevent fluid leakage therebetween. Inner end 44 of mount 43 defines internal threads 224. Check valve assembly 80 defines cooperating external threads 225 for connecting check valve assembly 80 to mount 43. An o-ring 260 is located between mount 43 and check valve assembly 80 to prevent fluid leakage therebetween.

Valve module 50 includes a mount 53, a ball valve assembly 70, e.g., Ball Valve Assembly Part No. FBV-775 also available from Watts Industries, and a check valve assembly 90, e.g., Check Valve Assembly Part No. SA-775CB37 also available from Watts Industries. A through bore 58 defined by mount 53 and ball valve assembly 70 is in fluid communication with bore 30 when check valve assembly 90 is in an open, flow position. Mount 53 has an outer end 52, an inner end 54, and a wall 55 having an outer surface 57 and an inner surface 56. Inner end 54 of mount 53 steps down in diameter at a shoulder 54a to define a contact surface 36. To secure mount 53 to housing 20, inner end 54 of mount 53 is inserted into first end 22 of housing 20, with contact surface 36 abutting inner surface 26 of housing 20. Securing material 38, e.g., solder or brazen, is used to connect contact surface 36 to inner surface 26 of wall 25.

Outer end 52 of mount 53 defines external threads 232. Ball valve assembly 70 defines cooperating internal threads 252 for connecting ball valve assembly 70 to mount 43. An o-ring 253 is located between mount 43 and ball valve assembly 70 to prevent fluid leakage therebetween. Inner end 54 of mount 53 defines internal threads 234. Check valve assembly 90 defines cooperating external threads 235 for connecting check valve assembly 90 to mount 43. An o-ring 270 is located between mount 43 and check valve assembly 90 to prevent fluid leakage therebetween.

Housing 20 defines a port 28 which provides access to bore 30 and check valve assemblies 80, 90. A lip 29 of housing 20 defines a region 301 (FIG. 2) for retaining fastening nuts 302 having an inner threaded bore 306. Port 28 is closed by securing a cover 27 to housing 20 with threaded fastening screws 300 which are received by nuts 302. A circumferential rim 31 of cover 27 defines a groove 303 in cover 27 in which an o-ring 305, e.g., made from Viton, is located to create a fluid-tight seal between cover 27 and lip 29.

Figure 2:
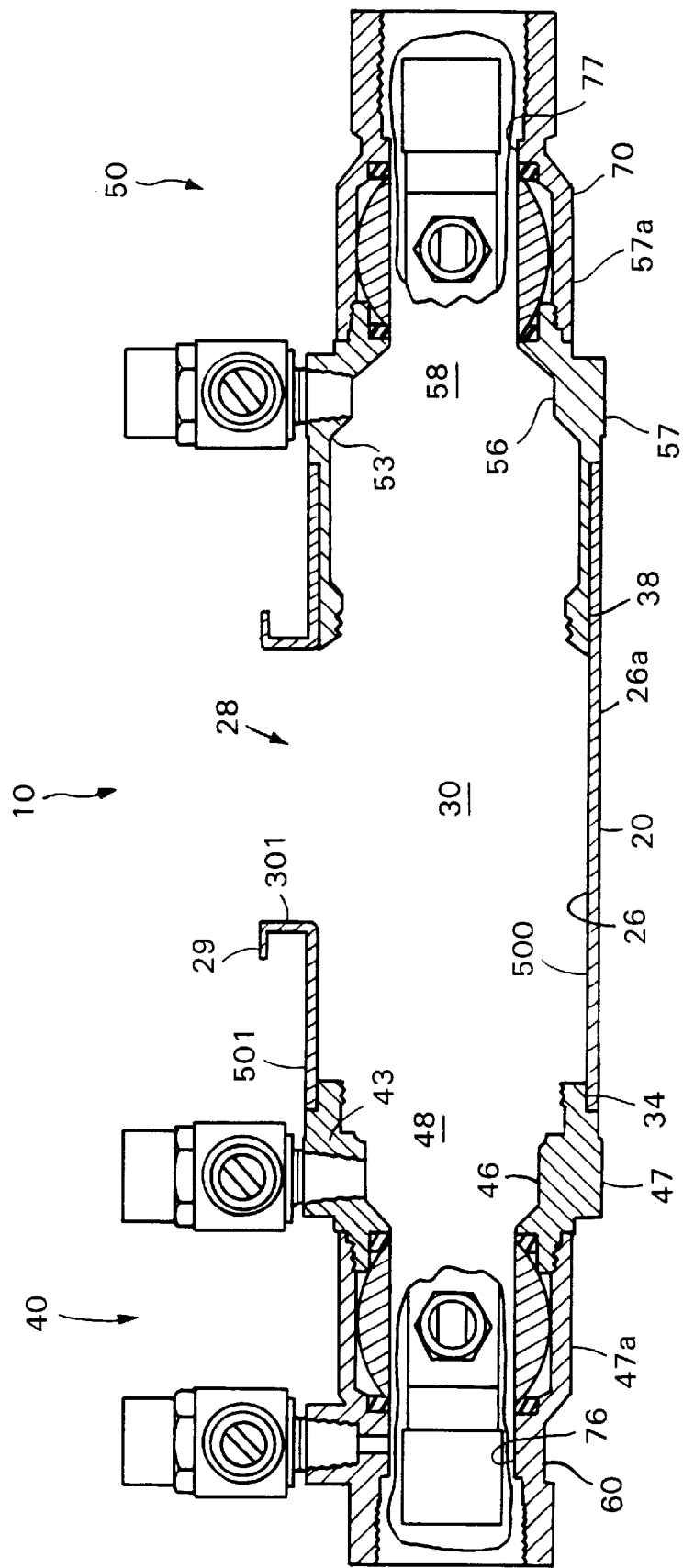
FIG. 2 is a cross-sectional view of the backflow preventer assembly of FIG. 1 shown with check valves and a cover removed.

Referring to FIG. 2, an assembly of mounts 43, 53, housing 20, and ball valve assemblies 60, 80 is plated. Inner surface 26 of housing 20, inner surface 46 of mount 43, inner surface 56 of mount 53, inner surface 76 of ball valve assembly 60, and inner 77 of ball valve assembly 80 are plated with, e.g., nickel, to form an inner wall 500. Ball valve assemblies 60, 80 are held in their open positions during the plating process, e.g., electroless nickel plating. Wall 500 acts to seal and restrict migration of securing material 34, 38 into bores 30, 48, and 58.

Plating material, e.g., nickel, is also applied to an outer surface 26a of housing 20, to outer surfaces 47, 57 of mounts 43, 53, respectively, and to outer surfaces 47a, 57a of ball valve assemblies 60, 70, respectively, to form an outer wall 501. Wall 501 acts to seal and restrict migration of securing material 34, 38. Walls 500, 501 also function to minimize oxidation of backflow preventer assembly 10 and to assist in sealing small leaks.

Check valve assemblies 80, 90 can be accessed for service and replacement through port 28. To remove a non-functioning check valve assembly, cover 27 is unscrewed from housing 20 and the check valve assembly is disengaged from its respective mount (43 or 53). A new or rebuilt check valve assembly is then inserted into back flow preventer assembly 10 through port 28 and engaged with the respective mount.

Check valve assemblies 80, 90 are oriented in sequence to allow flow of water through bore 30 in a first direction, indicated by arrow, F, (FIG. 1) but to prevent back flow of water in the opposite direction. Check valve modules 80, 90 are biased in the opposite direction of F to exceed a predetermined threshold before the check valves are opened.

In use, potable water from the public water distribution system enters the backflow preventer assembly 10 at an end 42a of ball valve assembly 60. Assuming that ball valve assemblies 60, 70 are open and that the supply pressure exceeds the predetermined threshold value biasing the check valve assemblies 80, 90 towards closed positions, the check valve assemblies open to allow water flow in through first end 42a of ball valve assembly 60, through bores 48, 30 and 58, and finally through an end 52a of ball valve assembly 70. In the closed position, ball valve assemblies 60, 70 are used to isolate backflow preventer assembly 10 from external water flow for either servicing check valve assemblies 80, 90, as described above, or testing water quality and pressure through a series of test ports 100, 110, 120, 130.

Other embodiments are within the following claims.

Figure 3:
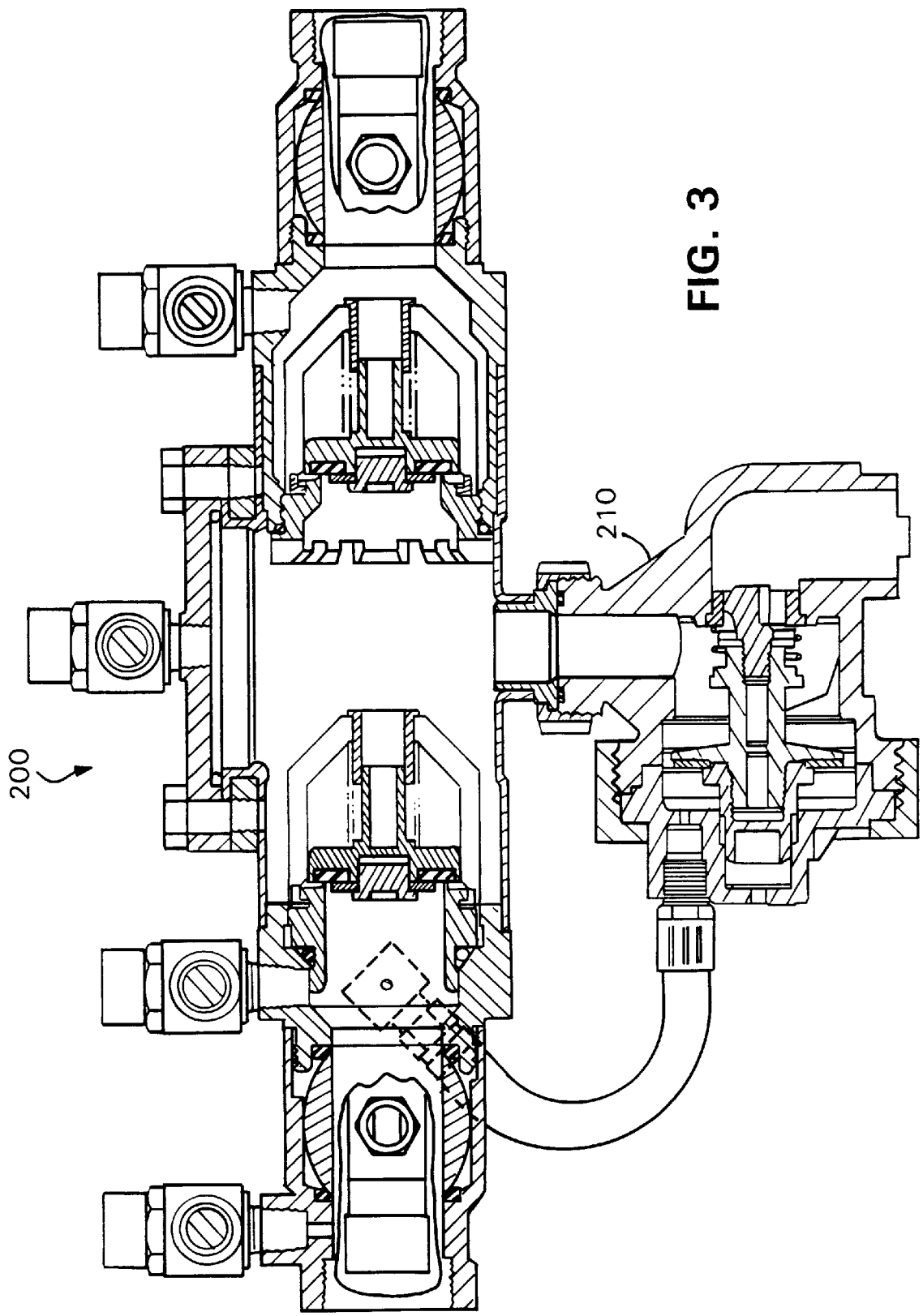
FIG. 3 is a cross-sectional view of a reduced pressure backflow preventer assembly.

For example, as shown in FIG. 3, a reduced pressure backflow preventer assembly 200 includes a pressure reduction assembly 210.

What is claimed is:

1. A backflow preventer assembly comprising:
   a housing having a first end and a second end, said housing including a wall having an inner surface defining a through bore extending between said first end and said second end,
   a first mounting assembly including a wall having an inner surface defining a through bore in fluid communication with said housing through bore, said first mounting assembly being configured for assembly by insertion with said first end of said housing,
   a second mounting assembly including a wall having an inner surface defining a through bore in fluid communication with said housing through bore, said second mounting assembly being configured for assembly by insertion with said second end of said housing, and
   securing material for securing opposed surfaces of said first mounting assembly and said housing, and for securing opposed surfaces of said second mounting assembly and said housing.

2. The backflow preventer assembly of claim 1, further comprising plating material located on said inner surface of said housing, said inner surface of said first mounting assembly, and said inner surface of said second mounting assembly, said plating material forming a wall restricting migration of said securing material into said housing bore, said first mounting assembly bore, and said second mounting assembly bore.

3. The backflow preventer assembly of claim 2, wherein the opposed surfaces comprise an outer surface of the first mounting assembly wall, an outer surface of the second mounting assembly wall, and an inner surface of the housing wall.

4. The backflow preventer assembly of claim 2, wherein the securing material comprises solder.

5. The backflow preventer assembly of claim 2, wherein the plating material comprises nickel.

6. The backflow preventer assembly of claim 2, wherein the first and second mounting assemblies each include an inner end and an outer end, the outer ends being threaded.

7. The backflow preventer assembly of claim 6, further comprising a first ball valve assembly threadedly attached to the outer end of the first mounting assembly, and a second ball valve assembly threadedly attached to the outer end of the second mounting assembly.

8. The backflow preventer assembly of claim 7, wherein an outer surface of the housing wall, an outer surface of the first mounting assembly wall, an outer surface of the second mounting assembly wall, an outer surface of the first ball valve assembly, and an outer surface of the second ball valve assembly include plating material.

9. The backflow preventer assembly of claim 8, wherein the plating material comprises nickel.

10. The backflow preventer assembly of claim 7, wherein an inner surface of the first ball valve assembly and an inner surface of the second ball valve assembly include plating material.

11. The backflow preventer assembly of claim 10, wherein the plating material comprises nickel.

12. The backflow preventer assembly of claim 6, wherein the inner ends are threaded, the backflow preventer assembly further comprising a first check valve assembly threadedly attached to the inner end of the first mounting assembly, and a second check valve assembly threadedly attached to the inner end of the second mounting assembly.

13. The backflow preventer assembly of claim 2, wherein the housing wall defines a port.

14. The backflow preventer assembly of claim 13, further comprising a cover for closing the port.

15. The backflow preventer assembly of claim 2, further comprising a plurality of test cocks.

16. The backflow preventer assembly of claim 2, further comprising a pressure reduction assembly.

17. The backflow preventer assembly of claim 2, wherein:
   said housing has an outer surface,
   said first mounting assembly has an inner end and an outer end, the inner end being threaded, and said wall of said first mounting assembly has an outer surface, said first mounting assembly being configured for assembling by insertion into said first end of said housing,
   said second mounting assembly has an inner end and an outer end, the inner end being threaded, and said wall of said second mounting assembly has an outer surface, said second mounting assembly being configured for assembling by insertion into said second end of said housing,
   said opposed surfaces secured by said securing material comprising the outer surface of said first mounting assembly secured to the inner surface of said housing, and the outer surface of said second mounting assembly secured to the inner surface of said housing,
   a first check valve assembly threadedly attached to the inner end of the first mounting assembly, and
   a second check valve assembly threadedly attached to the inner end of the second mounting assembly.

18. The backflow preventer assembly of claim 17, further comprising plating material located on said inner surface of said housing, said inner surface of said first mounting assembly, and said inner surface of said second mounting assembly, said plating material forming a wall restricting migration of said securing material into said housing bore, said first mounting assembly bore, and said second mounting assembly bore.

19. The backflow preventer assembly of claim 17 or 18, wherein the housing wall defines a port.

20. The backflow preventer assembly of claim 19, further comprising a cover for closing the port.

21. The backflow preventer assembly of claim 17 or 18, wherein the outer end of the first mounting assembly and the outer end of the second mounting assembly are threaded, the backflow preventer assembly further comprising a first ball valve assembly threadedly attached to the outer end of the first mounting assembly, and a second ball valve assembly threadedly attached to the outer end of the second mounting assembly.

22. A backflow preventer assembly comprising:
   a housing having a first end and a second end, said housing including a wall having an inner surface defining a through bore extending between said first end and said second end,
   a first mounting assembly including a wall having an inner surface defining a through bore in fluid communication with said housing through bore, said first mounting assembly being configured for assembly by insertion with said first end of said housing,
   a second mounting assembly including a wall having an inner surface defining a through bore in fluid communication with said housing through bore, said second mounting assembly being configured for assembly by insertion with said second end of said housing, and
   means for securing together said first mounting assembly with said first end of said housing and said second mounting assembly with said second end of said housing.

23. The backflow preventer assembly of claim 22, wherein said means for securing comprises securing material for securing opposed surfaces of said first mounting assembly with said housing and said second mounting assembly with said housing.

* * * * *